United States Patent
Bender

(10) Patent No.: US 9,887,402 B2
(45) Date of Patent: Feb. 6, 2018

(54) BATTERY HAVING SUPPORTING ELEMENTS

(71) Applicant: Dr. Ing. h.c.F. Porsche Aktiengesellschaft, Stuttgart (DE)

(72) Inventor: Stefan Bender, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 689 days.

(21) Appl. No.: 13/856,667

(22) Filed: Apr. 4, 2013

(65) Prior Publication Data

US 2013/0266835 A1  Oct. 10, 2013

(30) Foreign Application Priority Data

Apr. 4, 2012 (DE) .................. 10 2012 102 938

(51) Int. Cl.
H01M 2/10 (2006.01)
H01M 10/613 (2014.01)
H01M 10/6567 (2014.01)
H01M 10/625 (2014.01)

(52) U.S. Cl.
CPC ....... *H01M 2/1083* (2013.01); *H01M 10/613* (2015.04); *H01M 10/625* (2015.04); *H01M 10/6567* (2015.04); *H01M 2220/20* (2013.01)

(58) Field of Classification Search
CPC ............. H01M 2/1083; H01M 10/613; H01M 10/625; H01M 10/6567–10/6568
See application file for complete search history.

(56) References Cited

U.S. PATENT DOCUMENTS

| 5,538,809 | A | 7/1996 | Bittihn et al. | |
|---|---|---|---|---|
| 2003/0132040 | A1 | 7/2003 | Radosevich et al. | |
| 2007/0087266 | A1* | 4/2007 | Bourke | H01M 2/0242 429/159 |
| 2010/0224326 | A1 | 9/2010 | Gambini | |
| 2012/0082875 | A1* | 4/2012 | Watanabe | H01M 2/1077 429/71 |
| 2012/0082876 | A1* | 4/2012 | Yamamoto | H01M 2/10 429/90 |
| 2012/0224326 | A1 | 9/2012 | Kohlberger et al. | |

FOREIGN PATENT DOCUMENTS

| DE | 102 59 024 | 6/2004 |
|---|---|---|
| DE | 10 2009 040 197 | 3/2011 |
| DE | 10 2011 078 235 | 1/2013 |
| WO | 2009/041865 | 4/2009 |

OTHER PUBLICATIONS

German Search Report dated Jan. 25, 2013.

* cited by examiner

*Primary Examiner* — Maria Laios
*Assistant Examiner* — Robert S Carrico
(74) *Attorney, Agent, or Firm* — Gerald E. Hespos; Michael J. Porco; Matthew T. Hepsos

(57) ABSTRACT

A battery has at least one fluid connection (15) and at least one holder (12) for fastening the battery (1) to a supporting structure. To reduce unwanted damage to the battery, the fluid connection (15) is combined with the holder (12) so that the holder (12) protects the fluid connection (15) from mechanical damage.

6 Claims, 1 Drawing Sheet

BATTERY HAVING SUPPORTING ELEMENTS

CROSS REFERENCE TO RELATED APPLICATIONS

This application claims priority under 35 USC 119 to German Patent Appl. No. 10 2012 102 938.5 filed on Apr. 4, 2012, the entire disclosure of which is incorporated herein by reference.

BACKGROUND

1. Field of the Invention

The invention relates to a battery with at least one fluid connection and with at least one holder for fastening the battery to a supporting structure. The invention further relates to a holder and/or a fluid connection for such a battery. The invention additionally relates to a motor vehicle with a supporting structure to which such a battery is fastened.

2. Description of the Related Art

U.S. Pat. No. 5,538,809 discloses a device for coupling a battery to the charger in a change station. The device includes a terminal strip fastened to the battery. The terminal strip has plugs or sockets for electrical connection and, if appropriate, for air connection and for a water refilling device.

The object of the invention is to reduce the risk of unwanted damage to a battery with at least one fluid connection and with at least one holder for fastening the battery to a supporting structure.

SUMMARY OF THE INVENTION

The invention relates to a battery with at least one fluid connection and with at least one holder for fastening the battery to a supporting structure. The fluid connection is combined with the holder so that the holder protects the fluid connection from mechanical damage. The battery preferably comprises a plurality of fluid connections, including at least one fluid connection to supply a coolant and at least one connections to discharge a coolant. The two fluid connections can be combined with one another where appropriate. Each fluid connection preferably is assigned a holder. The battery also can have more than two fluid connections for supplying and discharging different media. The battery preferably is a high-voltage battery or traction battery of a motor vehicle that can be driven by an electric machine. The drive energy for the electric machine is provided by the battery. Significantly, the holder functions to fasten the battery to the supporting structure and to protect the fluid connection. As a result, it is possible in a simple manner to prevent unwanted discharge of fluid caused by damage to the fluid connection.

The fluid connection may be a connection stub that projects from a battery housing and the holder preferably surrounds the connection stub sufficiently to protect the connection stub. However, there is sufficient space to fasten one end of a line or a hose for supplying and/or discharging fluid to or from the connection stub.

The holder preferably projects at least as far from the battery housing as the fluid connection. As a result, unwanted mechanical damage to the connection can be prevented reliably in the event of an accident or crash.

The holder may be a bracket configured to ensure a stable fastening of the battery to the supporting structure. Furthermore, bracket preferably partially surrounds the fluid connection and protects the fluid connection from mechanical damage.

The holder preferably has two supporting elements and the fluid connection is between the supporting elements. The supporting elements preferably are flat and substantially perpendicular to the battery housing. The supporting elements preferably project farther from the battery housing than the fluid connection. The supporting elements increase the stability of the holder and protect the fluid connection particularly effectively.

The supporting elements may be configured as approximately right-angled triangles. One leg of each triangular supporting element is fastened to the battery housing. A fastening flange may advantageously be fastened to the other leg.

The holder may have a fastening flange arranged above the fluid connection. The fastening flange simplifies fastening the battery to the supporting structure. Screws can be mounted on the fastening flange to fasten the battery to the supporting structure.

The fastening flange preferably is connected integrally to the supporting elements to simplify the production of the holder and to reduce production costs. The holder preferably is a sheet-metal part such as a stamped and bent part. However, the holder can also be a casting and advantageously can be cast directly onto the battery housing.

The invention may also relate to a holder and/or a fluid connection for the above-described battery. The holder and/or the fluid connection can be handled separately.

The invention further relates to a motor vehicle with a supporting structure to which the above-described battery is fastened. The motor vehicle preferably is an electric or hybrid vehicle. The combination according of the fluid connection with the holder prevents or reduces unwanted damage in the event of a crash or collision during operation of the motor vehicle.

Further advantages, features and details of the invention will become apparent from the description below in which an exemplary embodiment is described in detail with reference to the drawing.

DETAILED DESCRIPTION OF THE PREFERRED EMBODIMENTS

Figure 1:
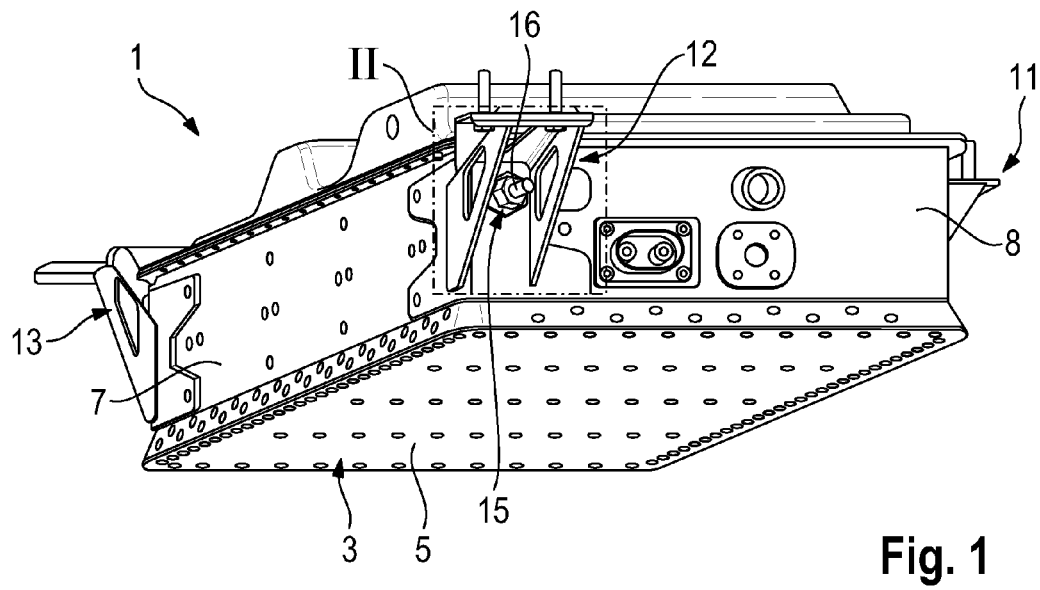
FIG. 1 is a perspective illustration of a battery according to the invention.

FIG. 1 is a perspective illustration of a battery 1 with a battery housing 3. The battery 1 is a traction battery for a hybrid and/or electric vehicle.

The hybrid and/or electric vehicle comprises an electric machine whose drive energy is provided by the battery 1. For this purpose, the battery 1, which also is referred to as a high-voltage battery, comprises a plurality of electrically interconnected battery modules or battery cells.

The battery cells or battery modules heat up during operation of the battery 1. Therefore, the battery 1 advantageously is equipped with a cooling device. The cooling device comprises, for example, a plurality of cooling ducts through which a coolant flows to discharge heat given off by the battery cells or battery modules.

The battery housing 3 has a base 5 and walls 7, 8. The base 5 delimits the battery housing 3 to the bottom. The walls 7, 8 delimit the substantially cuboidal battery housing 3 at its four sides. A cover closes the top of the battery housing 3.

Holders 11, 12, 13 are mounted on the battery housing 3 to fasten the battery 1 to a supporting structure (not shown) of the hybrid and/or electric vehicle. The holder 12 is combined with a fluid connection 15 so that the holder 12 protects the fluid connection 15 from mechanical damage.

The fluid connection 15 functions for the supply or discharge of cooling medium for the cooling device. The battery 1 preferably comprises at least one further connection (not visible in FIG. 1) for discharging or supplying the cooling medium. This connection, which is not visible in FIG. 1, preferably is equipped in exactly the same way as the connection 15 with a holder, which also is not visible in FIG. 1, and this holder is configured in exactly the same way or in a similar manner to the holder 12.

The connection 15 is a stub 16 that projects from the battery housing 3. One end of a line or hose for supplying or discharging cooling medium can be mounted on the stub 16.

The connection 15 projects from the battery housing 3 and therefore can be damaged. Damage can be caused, for example, be contact with the connection 15 during transport of the battery 1. Moreover, the connection 15 can be damaged or even torn off in the event of a crash or accident of the hybrid or electric vehicle. Such damage could cause an unwanted flow of cooling medium out of the battery 1.

To avoid such damage, the positions of the connection 15 and of the holder 12 are tailored to one another so that the holder 12 constitutes a mechanical protective frame for the connection 15. The holder 12 thus constitutes a mechanical protection for the connection 15, thereby reducing the risk of leakage of the cooling medium in the event of a crash of the hybrid or electric vehicle.

Figure 2:
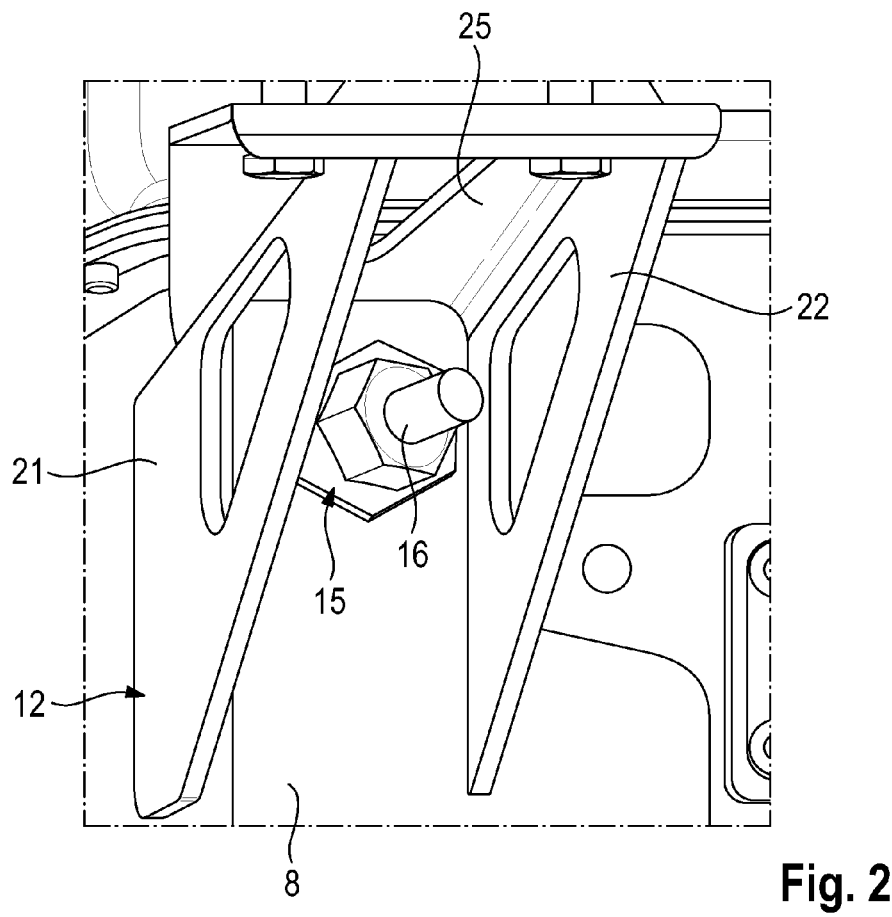
FIG. 2 shows an enlarged detail II from FIG. 1.

As shown in FIG. 2, the holder 12 projects from the wall 8 of the battery housing 3 farther than the protecting distance of the connection 15. As a result, a protective function is integrated into the holder 12 in a simple manner.

The holder 12 comprises two supporting elements 21, 22 that are configured as approximately right-angled triangles. A leg of each right triangular supporting element 21, 22 is fastened to the side wall 8 of the battery housing 3. A fastening flange 25 is fastened to the two upper legs of the supporting elements 21, 22.

The two supporting elements 21, 22 are parallel to one another and perpendicular to the wall 8. The fastening flange 25 extends substantially parallel to the base 5 of the battery housing 3 and perpendicular to the two supporting elements 21, 22. The supporting elements 21, 22 and the fastening flange 25 are provided with cutouts.

The supporting element 21, 22 and the fastening flange 25 are situated at such a spacing from the connection 15 that the holder 12 does not prevent a line end or hose end from being connected to the connection 15. At the same time, the supporting elements 21, 22 and the fastening flange 25 project somewhat farther from the wall 8 than the connection 15. As a result, the supporting elements 21, 22 and the fastening flange 25 define U-shaped protective frame around the connection 15.

What is claimed is:

1. A battery, comprising:
    a housing having a base and at least first and second side walls projecting from the base, the first and second side walls meeting at a corner;
    at least one fluid connection projecting from the first side wall of the housing in a projecting direction that is substantially perpendicular to the first side wall and substantially parallel to the second side wall; and
    at least one U-shaped holder for fastening the battery to a supporting structure, the at least one holder having a first supporting elements projecting from the first side wall in the projecting direction and at a position so that the at least one fluid connection is between the first supporting element and the corner between the first and second side walls, a second supporting element attached to the second side wall and projecting in the projecting direction to a position beyond the first side wall and a fastening flange extending substantially perpendicularly between the first and second supporting elements and fastened to the first and second supporting elements at positions spaced from the at least one fluid connection; wherein
    at least parts of the first and second supporting elements and the fastening flange project out from the first side wall a distance greater than a projecting distance of the at least one fluid connection so that the at least one fluid connection is protected by the at least one U-shaped holder from mechanical damage.

2. The battery of claim 1, wherein the at least one holder is a bracket.

3. The battery of claim 1, wherein the first and second supporting elements have substantially right-angled triangular shapes aligned so that projecting distances of the first and second supporting elements from the first side wall decrease at farther distances from the fastening flange, the at least one fluid connection being aligned with positions on the first and second supporting elements that project from the first side wall distances greater than the projecting distance of the at least one fluid connection.

4. The battery of claim 3 wherein the fluid connection is closer to the fastening flange than to locations on the first and second supporting elements that are farthest from the fastening flange.

5. The battery of claim 1, wherein the fastening flange is connected integrally to the first and second supporting elements.

6. The battery of claim 1, wherein the supporting structure is coupled to a motor vehicle.

* * * * *